H. J. BRENNECKE.
VARIABLE EYE PROTECTOR.
APPLICATION FILED MAR. 29, 1915.
1,193,231. Patented Aug. 1, 1916.
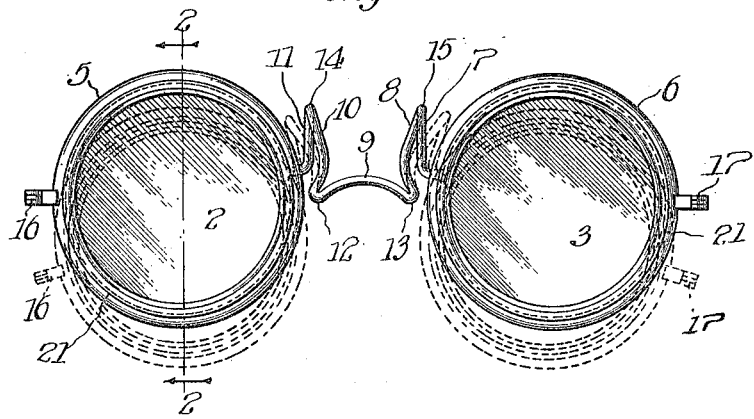
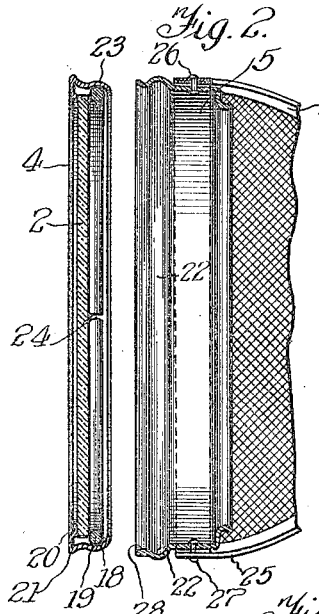
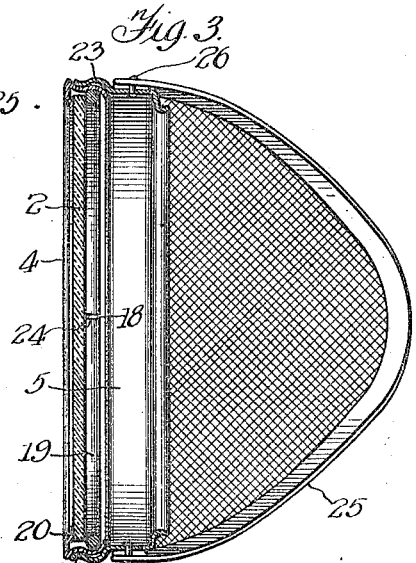
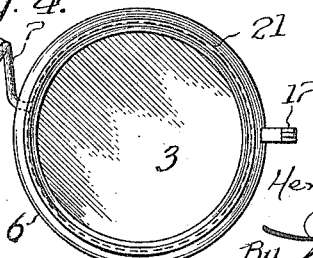
Witness:
A. J. Sauser.
Inventor:
Herman J. Brennecke
By James Peckstrom
Atty.

UNITED STATES PATENT OFFICE.

HERMAN J. BRENNECKE, OF CHICAGO, ILLINOIS, ASSIGNOR OF ONE-HALF TO ROBERT MALCOLM, OF CHICAGO, ILLINOIS.

VARIABLE EYE-PROTECTOR.

1,193,231. Specification of Letters Patent. Patented Aug. 1, 1916.

Application filed March 29, 1915. Serial No. 17,723.

*To all whom it may concern:*

Be it known that I, HERMAN J. BRENNECKE, a citizen of the United States, residing at Chicago, in the county of Cook and State of Illinois, have invented certain new and useful Improvements in Variable Eye-Protectors, of which the following is a specification.

My invention relates to goggles of the type known as mechanics' eye-protectors, and has particular reference to the details of construction thereof.

The objects of the invention are to provide a combination nose-piece and bridge connecting the lens frames which is extensible and contractible to vary the distance apart of the lenses without materially disturbing the level of the nose-piece with reference to the lenses, and to make the lenses conveniently removable when broken or damaged, as well as to make replacements of new lenses equally convenient. These eye-protectors being used in large quantities and involving considerable variation in adjustments to different forms of faces, the details of construction affecting cost are of the highest importance.

My invention consists in the novel construction, combination and arrangement of parts, all as hereinafter described in detail, illustrated in the accompanying drawing and incorporated in the appended claims.

In the drawing—Figure 1 is an elevation of a pair of eye protectors embodying my invention. Fig. 2 is an enlarged cross section taken substantially on line 2—2 of Fig. 1, but with the lens removed. Fig. 3 is a similar view with the lens in place. Fig. 4 is a view similar to Fig. 1, partly broken away, showing the partly begun operation of extending the bridge, indicated by dotted lines in Fig. 1, as completed.

In the several views 2 and 3 are the lenses each of which is mounted in a frame 4, the frames 4 being removably held in the two frames—5 and 6—which together with the connecting bridge for same, form the body of the protector. The bridge is a single piece of metal the ends of which are secured to the frames 5 and 6, intermediate of which ends this piece of metal, preferably a wire, is bent upwardly to form a leg 7, then downwardly in a curved leg 8 which approximates and follows the curvature of the lens 6, then toward the lens 2 in the form of an arch 9 which is the nose-piece portion, and finally upwardly and downwardly to the frame 5 to form legs 10 and 11 similar, respectively, to the legs 8 and 7. 12 and 13 and 14 and 15 are bends in said bridge and nose-piece which form angles which are increased or diminished to vary the distance between the lenses to conform to variations in the distances between eyes of different wearers.

In Fig. 1 the dotted lines show alterations in the bends 12 and 13 whereby the bends 14 and 15 are swung farther apart which has lowered the temples or temple joints—16 and 17. Fig. 4 shows the lenses, temples and other parts on the frame of the protector as a whole restored to substantially normal horizontal levels, by finally making the bends 14 and 15 more open, or the angles they produce less acute. This has spaced the lenses apart considerably and the changes shown may represent variations between minimum and maximum spacings apart, to be varied to fit the individual who is to use the eye-protector. By making the bends of the bridge and nose-piece in this form the use of a separately adjustable nose-piece is obviated and objections on the score of inartistic appearance are respected.

Lenses used for this purpose are comparatively short lived, being continually bombarded by flying fragments in the work shop, exposed to extreme heat, etc., and it is important to be able to exchange or renew lenses cheaply and conveniently. For this purpose the present invention makes provision for a simple sheet metal casing or frame such as shown in Fig. 2 on an enlarged scale. This frame is a ring stamped to form a channel 18 into which is sprung a wire ring 19 which forms a stop at one side for the lens. A stop for the opposite side of the lens is provided by bending the sheet metal ring to form a vertical flange 20, this bend being made to include a projecting bead 21 which may be grasped by the fingers of the user, or pried against, to release the lens from the frame 5 or 6, each of the latter frames having an interior configuration corresponding to the exterior configuration of the frame 4, being provided with a channel 22 into which the bead 23, formed by the channel 18, is pressed. The ring 19 is an open one and its meeting ends are shown at 24. Side dust shields, one for each lens, of the usual construction, 25, are pivoted to the frames 5 and 6 as at 26 and 27. The edge of the frame 5 or 6 is flared outwardly as at 28 to make the reception of the bead 23 and its pressure into the channel 22 convenient.

Having thus described my invention I claim as new and desire to secure by Letters Patent—

1. The combination with the bridge-connected frames of a pair of eye-protectors, of lens-supporting frames, each of the latter consisting of a sheet metal ring formed with a stop flange engaging one side of the lens and having a groove and a ring in said groove which engages the opposite side of the lens, each of said bridge-connected frames having a channel therein and each of said lens-supporting frames having a bead thereon which is removably snapped into and held in said channel.

2. The combination with a pair of eye-protectors and bridge connected frames therefor having channels therein, of lens-frames having beads thereon to engage said channels removably, the lenses for said lens frames, and means on said lens frames removably supporting said lenses in said lens-frames.

3. The combination with a pair of eye-protectors and bridge-connected frames therefor, of lenses, separate frames for said lenses, means supporting the lenses removably in said separate frames, and means on said lens frames supporting said separate frames removably in said bridge-connected frames.

In testimony whereof I have hereunto signed my name.

HERMAN J. BRENNECKE.

Copies of this patent may be obtained for five cents each, by addressing the "Commissioner of Patents, Washington, D. C."